United States Patent [19]
Lee

[11] Patent Number: 4,742,898
[45] Date of Patent: May 10, 1988

[54] SHOCK ABSORBER WITH GAS CHARGED RETURN SPRING

[75] Inventor: Patrick P. Lee, Orchard Park, N.Y.

[73] Assignee: Enidine Incorporated, Orchard Park, N.Y.

[21] Appl. No.: 908,170

[22] Filed: Sep. 17, 1986

[51] Int. Cl.$^4$ ............................................. F16F 9/48
[52] U.S. Cl. ..................................... 188/287; 188/315
[58] Field of Search ................ 188/287, 286, 285, 315

[56] References Cited

U.S. PATENT DOCUMENTS

| | | |
|---|---|---|
| 2,521,074 | 9/1950 | Marston . |
| 2,571,279 | 10/1951 | Mylestad . |
| 3,332,364 | 7/1967 | Smith . |
| 3,605,960 | 9/1971 | Singer ................................. 188/287 |
| 3,945,663 | 3/1976 | Duckett .......................... 188/315 X |
| 3,947,003 | 3/1976 | Jacobellis et al. . |
| 4,026,418 | 5/1977 | Hawthorne . |
| 4,257,499 | 3/1981 | Deschner . |
| 4,560,042 | 12/1985 | Sell et al. . |

*Primary Examiner*—Joseph Falk
*Attorney, Agent, or Firm*—Christel, Bean & Linihan

[57] ABSTRACT

A shock absorber comprising a housing assembly including an elongated cavity for containing hydraulic fluid, an annular cavity surrounding the elongated cavity, a piston assembly including a head slidably received by the elongated cavity and a rod joined to the head for movement therewith, a compressible bladder containing gas under pressure positioned within the annular cavity, and a plurality of orifices defined within the housing assembly through which the elongated and annular cavities communicate with one another. The rod extends through the housing assembly and is movable with the piston head between extended and retracted conditions. The bladder is positioned within the annular cavity so as to extend along at least a portion of the annular cavity and leave uncovered a portion of the inner wall. The plurality of orifices are arranged in a pattern along the uncovered portion of the inner wall. When shock forces acting upon the shock absorber move the rod from the extended condition to the retracted condition and thereby force hydraulic fluid from the elongated cavity into the annular cavity through the open ones of the orifices, the bladder is compressed from an expanded condition to a contracted condition to function as an accumulator and to store energy for returning the rod to the extended condition once forces acting upon the shock absorber are relieved.

42 Claims, 2 Drawing Sheets

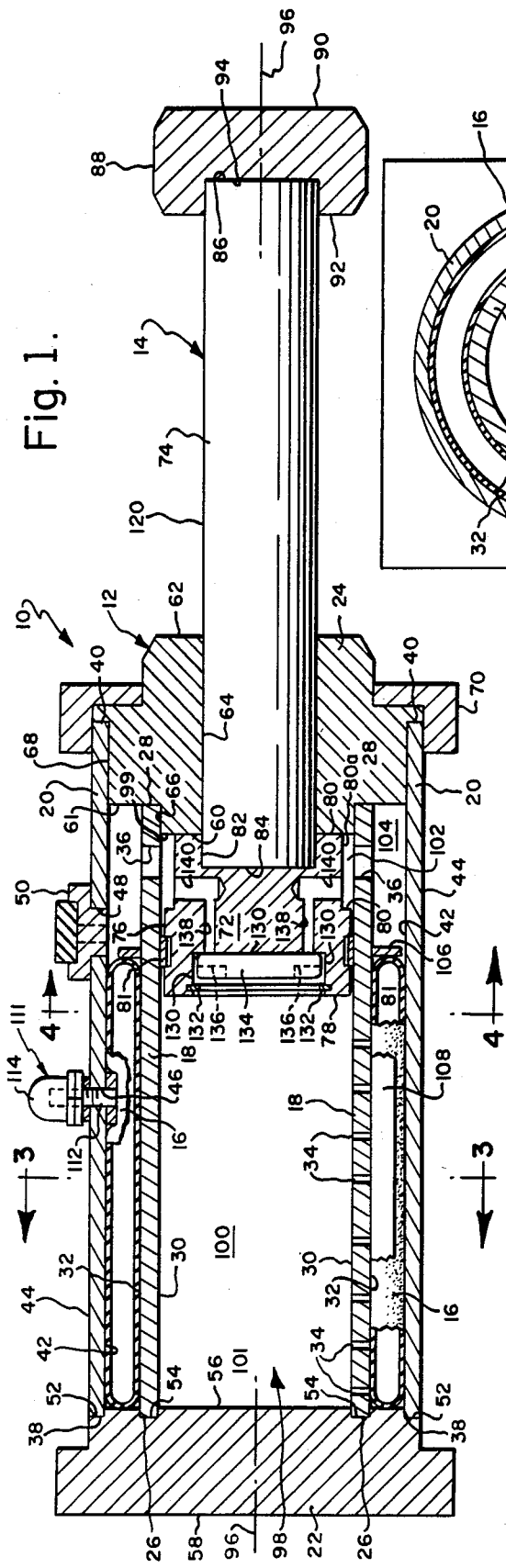
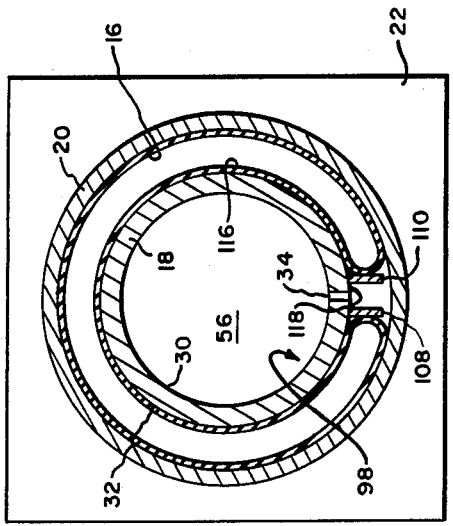
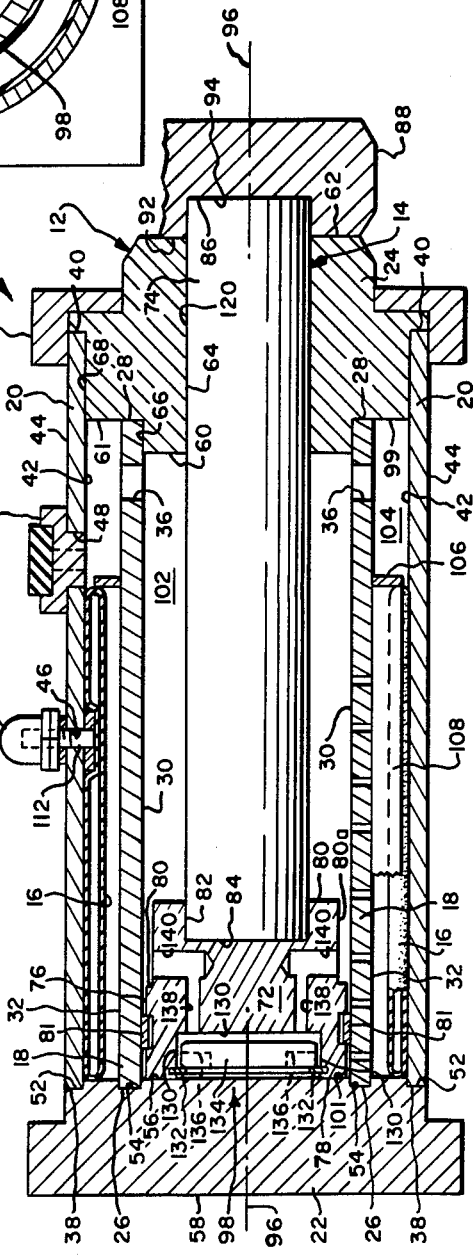
Fig. 1.
Fig. 2.
Fig. 3.

SHOCK ABSORBER WITH GAS CHARGED RETURN SPRING

This invention relates generally to shock absorbers and more particularly to a new and improved hydraulic shock absorber having a relatively small length-to-stroke ratio, relatively lower manufacturing cost and preselected dynamic shock absorbing characteristics.

The type of shock absorber with which this invention is concerned includes a housing assembly defining an elongated cavity, a piston assembly operatively associated with the elongated cavity for telescopic movement relative to the housing assembly, and a construction facilitating the control of the dynamic shock absorbing characteristics of the shock absorber. The piston assembly includes a head slidably movable in opposite directions along within the cavity and a rod extending from the head and out of the cavity through the housing and movable between extended and retracted conditions. The piston head defines within the cavity a variable-volume chamber for containing hydraulic fluid which decreases in size when the piston is moved from one end of the elongated cavity to the other, and the housing assembly includes means defining a hydraulic fluid reservoir and associated orifices or passages providing flow communication between the variable-volume chamber and the reservoir. As the rod is moved by an externally applied force from an extended condition to a retracted condition, the piston head moves from the one end of the elongated cavity toward the other forcing hydraulic fluid from the variable-volume chamber through the orifices to the reservoir. The orifices are typically sized to regulate the flow of hydraulic fluid therebetween producing dynamic shock forces and thereby absorbing energy as the piston head is forced from the one end of the elongated cavity to the other. Therefore, shock loading forces tending to abruptly move the rod from the extended condition to the retracted condition are effectively absorbed by the regulated flow of hydraulic fluid from the variable-volume chamber to the reservoir.

For controlling the dynamic shock absorbing characteristics of the shock absorber, the orifices each extend between the walls of the elongated cavity and the reservoir and are collectively arranged in a preselected pattern or series which generally extends lengthwise along a wall of the elongated cavity. Therefore, as the piston head moves from one end of the elongated cavity to the other, the orifices are blocked or closed in a preselected desired sequence by the piston head thereby reducing the number of orifices through which hydraulic fluid can exit the variable-volume chamber. By appropriately sizing and positioning the orifices along the wall of the elongated cavity, the shock absorber can, in effect, provide any type of shock curve.

Once the rod has been moved to the retracted condition and the loading forces removed therefrom, it is necessary to return the rod to the extended condition to prepare the shock absorber for a repeat of the impacting shock load. To this end, it is common for shock absorbers to include a metal return spring for acting on the piston assembly and thereby urge the rod from the retracted condition to the extended condition once the loading forces upon the rod are relieved.

Return springs for acting on the piston assembly are commonly coiled compression springs positioned either about the rod or inside the elongated cavity acting on the piston assembly. Movement of the rod from the extended condition to the retracted condition forces the coiled spring or springs from an extended condition to a compressed condition for returning the rod to the extended condition once loading forces acting upon the rod are removed.

A limitation associated with return springs such as the coil springs described above relates to the length of the rod or the housing assembly necessary to accommodate the lengths of the springs. For example, when the rod is in its retracted condition, the length of the rod or the housing assembly must be long enough to accommodate the length of the coiled spring when compressed. Of course, a relatively long rod or housing assembly requires a considerable overall length of the shock absorber. It therefore would be desirable to provide a new and improved shock absorber having means for returning the rod to an extended condition wherein the length of the rod or housing assembly necessary to accommodate the length of the coil springs is obviated and so that the overall length of the shock absorber can be as short as possible.

Additional limitations associated with such return springs include the cost of spring material and of material required for the rod and housing. Furthermore, when the housing assembly is increased in length assembly of the shock absorber becomes difficult. In addition, the force of such springs cannot be adjusted thereby requiring replacement, addition or removal of the springs.

A self contained shock absorber has the requirement for a volume compensating accumulator due to the fact that the rod is inserted in the housing assembly. The volume of the piston rod must be compensated for by means of such an accumulator which traditionally has been closed cellular foam, an air head between the elongated cavity and outer cylinder or a spring loaded piston accumulator usually fitted within the piston rod. The piston-type accumulator involves added costs and the need for an additional seal for reliability, the air-head can cause aeration of the hydraulic fluid which prevents rapid cycling of the unit and the foam-type accumulator increases the cost of the shock absorber.

Accordingly, it is an object of the present invention to provide a new and improved shock absorber of the aforedescribed type which circumvents the aforedescribed limitations associated with shock absorbers utilizing coiled springs for returning the rod to the extended condition.

Another object of the present invention is to provide such a shock absorber having the smallest possible length-to-stroke ratio.

Still another object of the present invention is to provide such a shock absorber with means for returning the rod to the extended condition wherein the return force can be easily adjusted.

Yet still another object of the present invention is to provide such a shock absorber having a new and improved accumulator which avoids the above-mentioned disadvantages associated with accumulators heretofore available.

A further object of the present invention is to provide such a shock absorber which avoids problems associated with coiled return springs and conventional accumulators wherein control of the dynamic shock absorbing characteristics is provided by a series of orifices along the path of the shock absorber piston.

A further object of the present invention is to provide such a shock absorber which is economical to manufacture and effective in operation.

SUMMARY OF THE INVENTION

This invention resides in a new and improved shock absorber utilizing a pressurized internal bladder for returning the shock absorber rod to an extended condition and for use as an accumulator wherein control of the dynamic shock absorbing characteristics of the shock absorber is provided by a series of orifices along the path of travel of the piston.

The shock absorber comprises housing means including means defining an elongated cavity for containing hydraulic fluid, piston means including a head slidably received by the elongated cavity and a distensible bladder containing fluid such as gas under pressure. The housing means further defines an annular cavity surrounding the elongated cavity and a plurality of orifices through which elongated and annular cavities communicate with one another. The piston means further includes an elongated rod having one end joined to the piston head and the other end extending out of the housing means. The piston head is adapted to slidably move relative to and along the length of the elongated cavity between one end of the elongated cavity and the other as the rod is moved by an externally applied force between an extended condition in which part of the rod extends from the housing means and a retracted condition in which part of the rod is moved into the housing means.

The improvement is characterized in that the distensible bladder is positioned within the annular cavity in a manner so as to leave uncovered a portion of the inner wall, which inner wall portion extends lengthwise along the elongated cavity. Furthermore, the plurality of orifices through which the elongated and annular cavities communicate with one another are arranged along the aforesaid portion of the annular cavity wall so that as the piston head slidably moves relative to and along the elongated cavity between opposite ends of the elongated cavity, the orifices are closed and opened in sequence by the piston head. The bladder is positioned in spaced relation to the orifices so as not to interfere with fluid flow through the orifices. When loading forces acting upon the shock absorber move the rod from the extended condition to the retracted condition and thereby force hydraulic fluid from the elongated cavity into the annular cavity through the open ones of the orifices, the bladder is forced from an expanded condition to a compressed condition to function as an accumulator and to store energy for subsequently returning the rod to the extended condition once loading forces acting upon the shock absorber are relieved.

BRIEF DESCRIPTION OF THE DRAWING FIGURES

FIG. 1 is a longitudinal cross sectional view, shown partially cut-away, of an embodiment of the shock absorber in accordance with the present invention and illustrating the piston rod when positioned in an extended condition.

FIG. 2 is a view similar to that of FIG. 1 illustrating the piston rod when positioned in a retracted condition.

FIG. 3 is a cross-sectional view taken about on line 3—3 of FIG. 1.

DETAILED DESCRIPTION OF THE ILLUSTRATED EMBODIMENTS

Figure 4:
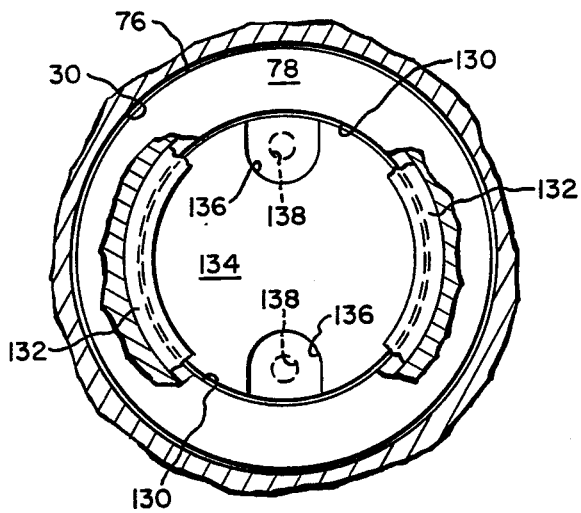
FIG. 4 is an enlarged cross-sectional view similar to FIG. 3 and taken on line 4—4 in FIG. 1.

Turning now to the drawings in greater detail and considering first FIGS. 1 and 2, there is shown an embodiment of a shock absorber, generally indicated 10, in accordance with the present invention. The shock absorber 10 includes means defining a housing assembly 12, means defining a piston assembly 14, and means defining a pressurized bladder 16 located within the housing assembly 12. The piston assembly 14 is mounted within the housing assembly 12 for movement relative to and along the length thereof and between an extended condition as shown in FIG. 1 and a retracted condition as shown in FIG. 2. As will be explained in greater detail hereinafter, the bladder 16 acts as a return spring between the housing assembly 12 and piston assembly 14 to move the piston assembly 14 from the FIG. 2 retracted condition to the FIG. 1 extended condition. The bladder 16 also functions as an accumulator as will be described.

The housing assembly 12 includes an inner sleeve 18, an outer sleeve 20 and a pair of opposite end caps 22, 24 as shown in FIGS. 1 and 2. The inner sleeve 18 is cylindrical in form, defines two opposite ends 26, 28 an interior wall 30 and an exterior wall 32. Defined in the inner sleeve 18 are a series of orifices 34, 34 extending between the interior and exterior walls 30, 32 and arranged in the device shown in a row extending axially along the inner sleeve 18 between the sleeve ends 26, 28. Alternatively, other arrangements of orifices can be employed such as helical patterns and others. The orifices 34, 34 have been sized and positioned along the sleeve wall 30 to provide the shock absorber 10 with preselected dynamic shock absorbing characteristics as will be apparent hereinafter. Also provided in the inner sleeve 18 are a pair of diametrically opposed passageways 36, 36 extending between the interior and exterior walls 30, 32 and positioned adjacent the sleeve end 28.

The outer sleeve 20 is shown in cylindrical in form, defines two opposite ends 38, 40, an interior wall 42 and an exterior wall 44. As shown in FIGS. 1 and 2, the outer sleeve is a little longer in length than that of the inner sleeve 18. Defined in the outer sleeve 20 are a pair of ports 46, 48 extending between the interior and exterior walls 42, 44. In the device shown the port 46 is positioned substantially midway along the length of the outer sleeve 20, and the port 48 is positioned substantially midway between the opening 46 and sleeve end 40. Sealingly positioned within the opening 48 is a plug providing a fill port 50 through which the shock absorber 10 can be filled or emptied of hydraulic fluid.

The inner and outer sleeves 18, 20 typically are concentrically arranged and positioned relative to one another so that the respective sleeve ends 26 and 38 generally corrrespond with one another. The end caps 22 and 24 support the inner with the outer sleeves 18, 20 in the aforesaid arrangement. To this end, the end cap 22 is in the form of a relatively short plug-like cylindrical body having two opposite end faces 56, 58 with the one end face 56 defining a pair of grooves or recesses 52, 54 therein. Each of the sleeve ends 26 and 38 is fitted within a corresponding one of the grooves 54 and 52, respectively.

The end cap 24 is in the form of a plug-like body defining opposite end faces 60, 62 as shown, and a central through-bore 64 extends between the end faces 60, 62. The body of the end cap 24 defines a pair of anular surfaces 66 and 68, adjacent the cap face 60 about which the sleeve ends 28 and 40, respectively, are fitted. An illustrative means for securing the end cap 24 and outer sleeve 20 is a flanged retainer cap or ring 70 fitted about the end cap 24 and outer sleeve 20 as shown.

With reference still to FIGS. 1 and 2, the piston assembly 14 includes a head 72 and a rod 74 attached to the head 72. The head 72 is in the form of a plug-like body having a cylindrical outer surface 76 and two opposite end faces 78, 80. The diameter of the cylindrical surface 76 is of such size to be closely received by yet permit sliding movement of the piston head relative to and lengthwise along the interior wall 30 of the inner sleeve 18. An annular groove is formed in the body of piston head 72 axially inwardly of end faces 78, 80 and receives a piston ring element 81 which serves to prevent liquid within the sleeve 18 by-passing the piston during operation of the shock absorber. The head end face 78 is planar and generally faces the end face 56 of the end cap 22, and the other head end face 80 defines a centrally-positioned central recess 82 which is about equal in diameter to that of the rod 74.

The rod 74 is in the form of an elongated ram having two opposite ends 84, 86 wherein one end 84 is fixed within the circular recess 82 of the head 72 and the other end 86 extends through the bore 64 of the end cap 24 and out of the housing assembly 12. The rod 74 is of such size to be closely yet slidably received by the end cap bore 64. The receipt of the rod 74 by the end cap bore 64 permits the rod 74 to be slidably moved relative to the housing assembly 12 between an extended condition as shown in FIG. 1, in which a central part, indicated 120, extends from the housing assembly 12, and a retracted condition, as shown in FIG. 2, at which the central rod part 120 is retracted within the housing assembly 12. A cap 88 is fixed to end 86 of rod 74 and has an abutment surface 90 which generally faces away from the housing assembly 12 and axially therealong and an opposite surface 92 is provided adjacent the end 86 of the rod 74 as shown. More specifically, the end cap surface 92 defines a circular recess 94 within which the ram end 86 is fitted.

It will be understood that the interior wall 30 of the inner sleeve 18 and the end faces 56, 60 of the end caps 22, 24, respectively, collectively define an elongated cylindrical cavity 98 having a longitudinal axis indicated 96 and first and second opposite ends 99, 101, respectively. Furthermore, the piston head 72 divides the elongated cavity 98 into first and second variable-volume chambers 100, 102, respectively. The first variable-volume chamber 100 is defined by the space between the interior wall 30 of the inner sleeve 18, the end cap face 56 and the piston head face 78. The second variable-volume chamber 102 is collectively defined by space between the interior wall 30, the end cap face 60 and the piston head face 80. As the piston head 72 is moved along the length of and relative to the elongated cavity 98 in one axial direction or the other between the cavity ends 99, 101, the internal volume of the first chamber 100 increases or decreases while the internal volume of the second chamber 102 decreases or increases.

It will also be understood that the space defined between the exterior wall 32 of the inner sleeve 18, the interior wall 42 of the outer sleeve 20 and end caps 22 and 44 collectively provide an annular cavity 104 which encircles the elongated cavity 98. Flow communication between the elongated cavity 98 and the annular cavity 104 is provided by the series of orifices 34, 34 and the return flow passageways 36 which extend between the elongated and annular cavities 98, 104. Due to the operative positioning of the orifices 34 and passages 36, 36 along the wall 30 of the inner sleeve 18, the orifices 34, 34 provide flow communication between at least the first variable volume chamber 100 and the annular cavity 104 while the return flow pasages 36, 36 provide flow communication between the annular cavity 104 and the second variable volume chamber 102.

In the illustrated shock absorber according to the present invention, there is positioned within the annular cavity 104 retainer means including a retainer ring 106 and a pair of retainer rails 108, 110 for limiting the movement of the bladder 16 hereinafter described. More specifically, the retainer ring 106 is a ring closely fitted so as to be snuggly received about the exterior wall 32 of the inner sleeve 18 and located along the length of the inner sleeve 18 so as to be positioned relative to the passages 36, 36 in a direction toward the end cap 22. A shown in FIGS. 1 and 2, there exists a spacing between the ring 106 and the interior wall 42 of the outer sleeve 20 permitting the flow of hydraulic fluid therethrough.

The rails 108, 110 extend between the ring 106 and the end cap 22 and are secured to the exterior wall 32 of the inner sleeve 18. As best shown in FIG. 3, the rails 108, 110 extend axially along the length of the inner sleeve 18, are positioned on one side, in the present illustration the lower side as shown in FIG. 3, of the inner sleeve 18, and are arranged in parallel relationship to one another and spaced apart so that the orifices 34, 34 open into the annular cavity 104 between the spaced rails 108, 110.

In accordance with the present invention and with reference again to FIGS. 1 and 2, the pressurized bladder 16 is located within the annular cavity 104, and, more specifically, is located within the space of the annular cavity bounded by the end cap 22, ring 106 and rails 108, 110. The pressurized bladder 16 is constructed of an impervious elastomeric and resilient material such as neoprene rubber, urethane, Viton or other suitable material adapted to withstand relatively high internal pressures and operating temperature ranges and contract and distend in response to differences in internal and external pressures on the bladder 16. The bladder 16 is of such shape that when assembled in the shock absorber 10 and as shown in FIG. 3, the bladder 16 encircles and effectively covers a major portion, indicated 116, of the circumference of wall 32 of the inner sleeve 18 and spans, as shown in FIGS. 1 and 2, substantially the entire length between end cap 22 and ring 106. It will be understood that the remaining portion, indicated 118 in FIG. 3, of the inner sleeve wall 32 which extends lengthwise along the inner sleeve 18 is left uncovered by the bladder 16. To permit charging of the bladder to a preselected pressure, a valve, generally indicated 111, having a stem 112 is sealably received by the opening 46 in the outer sleeve 20 and operatively attached to the wall of the bladder 16 in a fluid tight manner. A valve cap 114 covers the valve stem 112 when the stem 112 is not being used to charge the bladder 16.

In preparation of the shock absorber 10 for use, the elongated and annular cavities 98, 104 are filled with hydraulic fluid through the fill port 50 and the bladder 16 is precharged or pressurized with fluid such as gas, by means of the valve 111 to a preselected internal pressure such as, for example, fifty pounds per square inch (psi) or 3.5 bars. This initial pressure has been found to provide the most effective outer sleeve 20 sizing ratio of wall 44 to wall 42. With the rod 74 positioned in the FIG. 1 extended condition, the bladder 16 is in a distended, or expanded, condition as shown in FIG. 1. The shock absorber 10 is then operatively positioned between two relatively movable objects between which it is desirable to absorb shock forces that one object would otherwise impart upon the other. To this end, the housing assembly 12 is attached to a first of the relatively movable objects and the shock absorber 10 is positioned so that the rod end 86 is generally directed along a path of movement which the second object is expected to follow when moving relative to and toward the first object. In this position the abutment surface 90 of the rod end cap 88 generally faces the second object. Exemplary applications in which the shock absorber 10 finds use include end stops for assembly line shuttles, crane buffers, elevator and conveyor stops, railroad end of the car and sliding sill buffers, and many other applications.

When shock loading forces are imposed upon the shock absorber 10 by, for example, two relatively movable objects which tend to abruptly move the rod 74 from the FIG. 1 extended condition to the FIG. 2 retracted condition, the piston head 72 slidably moves relative to and along the length of the elongated cavity 98 from cavity end 99 toward cavity end 101 forcing hydraulic fluid to flow out of the first variable-volume chamber 100 through the series of orifices 34, 34. As the piston head slidably moves along within cavity 98, the cylindrical surface 76 of the piston head 72 covers, in sequence, the orifices 34, 34 beginning with the orifice 34 positioned closest to the elongated cavity end 99. Of course, with the orifices 34, 34 being covered in sequence, the number of orifices 34, 34 through which hydraulic fluid can exit the first variable-volume chamber is reduced as the piston head 72 moves toward cavity end 101. Hence, the orifices 34, 34 regulate the flow of hydraulic fluid from the elongated cavity 98 to the annular cavity 104 to control, for example, the rate at which the piston rod 74 and head 72 can move from one end 99 of the cavity 98 to the other end 101 of the cavity as a function of the magnitude of the loading force and velocity. The size, shape and positioning of the orifices 34, 34 along the inner sleeve wall 32 is responsible for the shape of the shock curve and other dynamic shock absorbing characteristics of the shock absorber 10.

As hydraulic fluid is forced to exit the orifices 34, 34 ad enter the annular cavity 104, pressure within the annular cavity is increased thereby forcing or compressing the bladder 16 to a compressed or contracted condition, as shown in FIG. 2, and consequently increasing the internal pressure of the bladder 16. It will be understood that the compressing of the bladder 16 and permitted flow of the hydraulic fluid from the annular cavity 104 to the second variable-volume chamber 102 through the passages 36, 36 accommodate the exiting of hydraulic fluid from the first variable-volume chamber 100 through the orifices 34, 34. By way of example, in an illustrative shock absorber, the internal pressure of bladder 16 increases from the aforesaid 50 psi (3.5 bars) initial condition to about 100 psi (7.0 bars) when bladder 16 is compressed as described. This pressure ratio of 2:1 between the compressed and initial conditions of bladder 16 provides the optimum pressure levels for shock absorber operation and for minimum outer sleeve to inner sleeve diameter ratio or proportion.

Once the bladder 16 has been forced to the FIG. 2 compressed condition and loading forces acting between the ram 74 and housing assembly 12 are relieved, the increased internal pressure of the bladder 16 urges the bladder 16 toward its FIG. 1 expanded condition while the expansion of the bladder 16 forces a flow of hydraulic fluid from the annular cavity 104 through passageways 36 to chamber 102 and then through a valve arrangement in piston head 72 to the first variable-volume chamber 100 to return the piston head 72 from the cavity end 101 to the cavity end 98 and thus return the piston assembly 14 from the FIG. 2 retracted condition to the FIG. 1 extended condition. The valve arrangement in piston head 72, as shown in FIGS. 1 and 4, includes a circular recess 130 in piston face 72, a retaining ring 132 fitted in an annular groove in the circumferential wall of recess 130, a disc-shaped valve element 134 axially shiftable in recess 130 and having passages 136 in the face disposed toward chamber 100, a first set of bores or passages 138 in piston head 72 extending axially inwardly from the axial wall of recess 130 and located in registry with the valve element passages 136, and a second set of bores or passages 140 in piston head 72 extending radially outwardly from passages 138 to the outer surface 80a of piston head 72. During movement of piston head 72 to the left as viewed in FIG. 1 reducing the volume of chamber 100, fluid pressure in chamber 100 acts on valve element 134 urging it against the axial wall of recess 130 closing passages 138 as shown in FIG. 1. This prevents flow of fluid from chamber 100 through portion head 72 to chamber 102. During movement of piston head 72 to the right as viewed in FIG. 2 reducing the volume of chamber 102, pressure in chamber 102 acts through passages 138 and 140 on valve element 134 urging it against retaining ring 132 as shown in FIG. 2. This allows flow of fluid from chamber 102, through the gap between piston surface 80a and sleeve 18, through passages 140 and 138 into recess 130, through the gap or clearance between the circumferential wall of recess 130, through the passages 136 in valve element 134 and into chamber 100.

It will be appreciated that the hydraulic fluid pressure existing within the second variable-volume chamber 102 as a result of the expansion of the bladder 16 is substantially the same as that existing within the first variable-volume chamber 100, but the greater surface area provided by the piston head face 78 over that of the piston head face 80 provides a difference in area on which the pressure acts to provide a net force acting upon the piston head 72 which moves the head 72 toward the first end 99 of the elongated cavity 98. It will also be understood that once the piston head 72 has been returned by the bladder 16 to the first end of the cavity 98, the rod 74 is positioned in the FIG. 1 extended condition in preparation for absorbing another impact acting upon the shock absorber 10.

Because the bladder 16 illustrated in FIGS. 1-3 is of such shape and size so as not to cover the inner sleeve portion 118, the sleeve portion 118 provides an available part of the inner sleeve 18 in which various patterns of orifices can be formed or arranged for providing the shock absorber 10 with desired shock-absorbing characteristics. Inasmuch as the size, shape and positioning of orifices 34, 34 along the length of the inner sleeve 18 is responsible for the shape of the shock curve or other shock-absorbing characteristics such as load deceleration rate of the shock absorber 10, the shape of the bladder 16 facilitates a variation of orifice size and pattern between two shock absorbers of the construction to provide two shock absorbers with different load-absorbing characteristics. Hence, no matter what orifice pattern is defined along the inner sleeve portion 118, the bladder 16 will leave exposed the opening of the orifices 34, 34 into the annular cavity 104. This also avoids any damage to bladder 16 which might otherwise be caused by the high velocity of fluid flowing through orifices 34 into annular cavity 104.

The bladder 16 is advantageous for the spring action it provides for returning the rod 74 to the FIG. 1 extended condition. Therefore, any need for a metal coil spring, commonly utilized in conventional shock absorbers, for returning the rod 74 to the FIG. 1 extended condition is circumvented, and the shock absorber 10 can be constructed with the smallest possible overall length-to-stroke ratio. In addition, the provision of bladder 16 removes the cost associated with the material of such coil springs as well as the cost of material for the longer rods and housings associated with such coil springs. Also, providing bladder 16 avoids assembly problems with shock absorbers having relatively long housing assemblies required by some coil spring arrangements.

The bladder 16 is also advantageouss in that its compression during a shock-absorbing operation increases the fluid-containing capacity of the annular cavity 104. Therefore, the bladder 16 effectively serves the same function as does an accumulator used in the fluid reservior-defining means of common conventional shock absorbers for compensating for a change in total hydraulic fluid volume of the shock absorber as the piston rod moves into and out of the housing cavity. Hence, with bladder 16 serving as an accumulator the problems previously mentioned in connection with piston-type, air-head and foam accumulators are avoided.

The bladder retaining rails 108, 110, ring 106 and end cap face 56 are advantageous in that they collectively limit any longitudinal movement of the bladder 16 along the length of the inner sleeve 18. Of course, the spacing between the inner and out sleeves 18 and 20 permit the bladder 26 to compress and expand as aforedescribed, but the abutting relationship shown in FIGS. 1-3 between the bladder 16 and retaining rails 108, 110, ring 106 and end cap face 56 substantially maintains the bladder 16 in a stationary position along the length of the housing assembly 12.

The ability to easily adjust the pressure within bladder 16 provides an important additional advantage over conventional fixed rate return springs such as metal coil springs typically employed in of shock absorbers.

Figure 5:
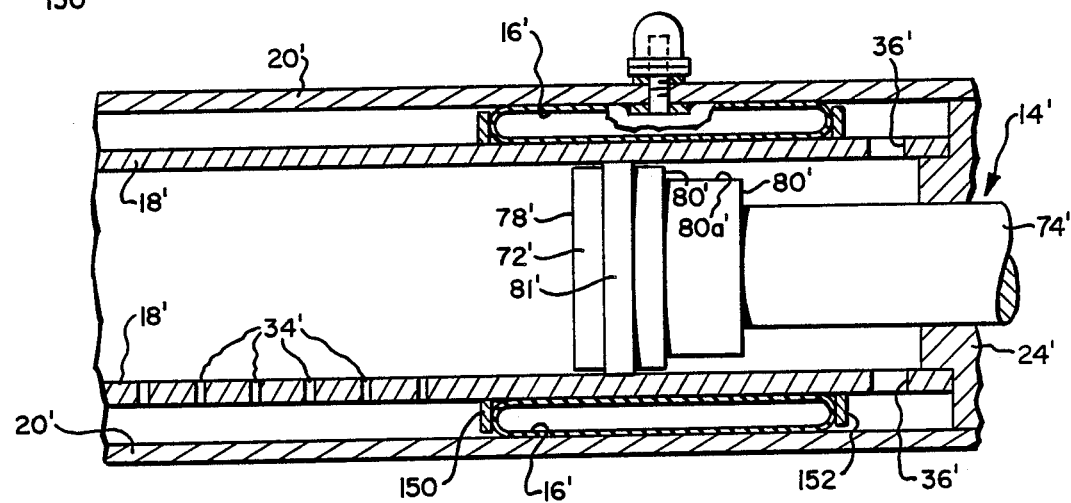
FIG. 5 is a fragmentary longitudinal sectional view similar to FIG. 1 and showing another embodiment of the present invention.

FIG. 5 illustrates an arrangement according to another embodiment of the present invention wherein the bladder, designated 16', is in the shape of a continuous ring or annulus and spaced axially from orifices 34'. In particular, the doughnut-shaped or toroidal bladder 16' preferably would be located in the annular cavity 104' axially near the rod end. The orifices 34' are located in sleeve 18' between bladder 16' and the opposite end of the shock absorber. As a result, the inner surface of bladder 16' can contact the outer surface 18, around the entire circumference thereof and yet not block any of the orifices 34'. A pair of axially spaced retaining rings 150, 152 maintain the axial location of bladder 16'. Bladder 16' is shown in FIG. 5 in an initial pressurized condition similar to that of FIG. 1 and prior to compression.

Figure 6:
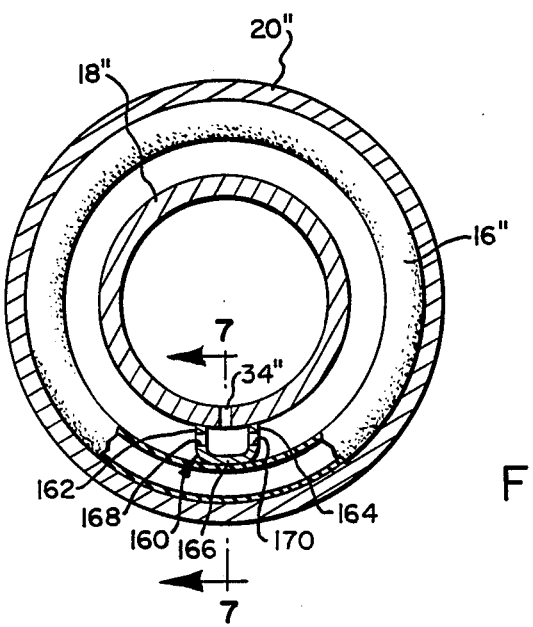
FIG. 6 is an enlarged cross-sectional view similar to FIG. 3 and showing a further embodiment of the present invention.
Figure 7:
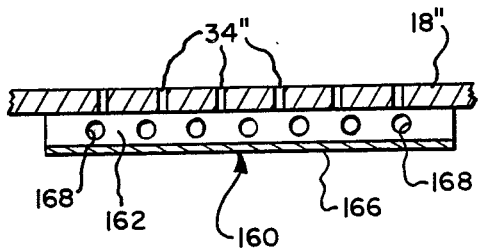
FIG. 7 is a fragmentary vertical sectional view taken about on line 7—7 in FIG. 6.

FIGS. 6 and 7 illustrate an arrangement according to another embodiment of the present invention wherein the bladder, designated 16", is in the form of a cylinder or sleeve extending axially along the region of sleeve 18" containing the orifices 34" and there is provided axially extending means for spacing bladder 16" from orifices 34". In particular, bladder 16" would extend axially along sleeve 18" in a manner similar to that of bladder 16 as shown in FIGS. 1 and 2, abutting the shock absorber end cap (not shown) at one end and abutting a retaining ring (not shown) at the other end similar to ring 106 of FIGS. 1 and 2. There is provided a baffle generally designated 160 on the outer surface of sleeve 18" extending axially along and in straddling relation to orifices 34". In particular baffle 160 includes a pair of spaced apart side wall portions 162 and 164 extending outwardly from the outer surface of sleeve 18" on opposite sides of orifices 34" which side walls are joined by a web or intermediate wall portion 166. A row or series of relatively large diameter openings or passages 168 is provided in wall 162 axially therealong, and a corresponding series of openings 170 is provided along wall 164. As the piston (not shown) moves along within sleeve 18" progressively closing the orifices 34" as previously described, fluid flows from within sleeve 18" through orifices 34" into the interior region of baffle 160 and out through the openings 168, 170 into the portions of the annular cavity 104" not occupied by bladder 16". As a result, bladder 16" can be in the form of a continuous cylinder or sleeve extending around the entire circumference of sleeve 18" and in the region thereof containing orifices 34", the baffle means 160 serving to space bladder 16" from orifices 34" in a manner allowing fluid flow through orifice 34" into annular cavity 104". Bladder 16" is shown in FIGS. 6 and 7 in an initial pressurized condition similar to that of FIGS. 1 and 3 and prior to compression.

The embodiments of FIGS. 5-7 include all the advantages of the embodiment of FIGS. 1-3 in that the bladders 16' and 16" serve both as a return spring for the piston assembly and as an accumulator.

It is therefore apparent that the present invention accomplishes its intended objects. There is provided a shock absorber utilizing a pressurized internal bladder for returning the shock absorber piston rod to an extended condition and for use as an accumulator. This is accomplished in a shock absorber wherein control of the dynamic shock absorbing characteristics is provided by a series of orifices along the path of travel of the shock absorber piston. The shock absorber of the present invention thus avoids the disadvantage and limitations associated with shock absorbers utilizing coil return springs for returning the piston rod to an extended condition. The provision of the pressurized internal bladder also enables the shock absorber to have the smallest possible length-to-stroke ratio and permits easy adjustment of the return force acting on the piston rod. The fact that the pressurized internal bladder also functions as an accumulator advantageously avoids disadvantages and limitations associated with shock absorber accumulators heretofore available. Thus, the shock absorber of the present invention advantageously avoids the problems associated with coil return springs and conventional accumulators and in a shock absorber of the type wherein control of the dynamic shock absorbing characteristics is provided by a series of orifices along the path of travel of the shock absorber piston.

While embodiments of the present invention have been described in detail, that is for the purpose of illustration, not limitation.

I claim:

1. In a shock absorber including housing means defining an elongated cavity for containing hydraulic fluid, an annular cavity surrounding said elongated cavity, and piston means including a head slidably received by said elongate cavity for sliding movement relative to and lengthwise along said elongated cavity and an elongated rod attached to said head, said rod having one end extending from said housing means and movable with said piston head between an extended condition at which a part of said rod extends from said housing means and a retracted condition at which said rod part is retracted within said housing means, the improvement comprising:

means defining a compressible bladder containing fluid under pressure positioned within said annular cavity so as extend along at least a portion of said elongated cavity and leave uncovered a portion of an inner wall of said annular cavity, which uncovered inner wall portion extends along said elongated cavity;

orifice means providing fluid flow communication between said elongated cavity and said annular cavity and located along the path of travel of said piston head and along said uncovered inner wall portion so that as said piston head slidably moves along within the elongated cavity said piston means progressively registers with said orifice means so that when shock forces act upon said shock absorber said forces move said rod from said extended condition to said retracted condition to progressively close said orifice means and thereby force hydraulic fluid from said elongated cavity into said annular cavity through said orifice means said bladder is forced from an expanded condition to a compressed condition to function as an accumulator and to store energy for returning said rod to said extended condition once forces acting upon said shock absorber are relieved; and means for spacing said bladder from said orifice means to allow fluid flow through said orifice means into said annular cavity.

2. The improvement of claim 1, wherein said orifice means comprises a plurality of spaced orifices arranged generally in a series along said uncovered portion of said annular cavity wall.

3. The improvement of claim 2 wherein said series of orifices extends axially along one side of said wall of said annular cavity and said bladder is wrapped within said annular cavity so as to define two opposite side edges extending axially along said annular cavity and spaced from one another generally along said one side of said wall so that said orifices open into said annular cavity between said opposing edges of said bladder.

4. The improvement of claim 3, wherein said spacing means comprises retaining means associated with said annular cavity of said housing means for maintaining said bladder in substantially stationary condition relative to said housing means.

5. The improvement of claim 4 wherein said retaining means includes a pair of retainer rails secured in position in said annular cavity so as to extend axially therealong, each of said rails positioned adjacent a corresponding one of said opposing side edges of said bladder to limit circumferential movement of said bladder to and about said annular cavity wall.

6. The improvement of claim 4 wherein said bladder defines two opposite ends each corresponding with a corresponding end of said annular cavity and said retaining means includes means defining abutment surfaces between which said opposite ends of said annular cavity are positioned to limit longitudinal movement of said bladder relative to said annular cavity.

7. The improvement of claim 1, wherein said spacing means comprises retaining means associated with said annular cavity of said housing means for maintaining said bladder in a substantially stationary position relative to said housing means.

8. The improvement of claim 1, wherein said bladder is annular in shape extending around the entire circumference of said inner wall of said annular cavity, said orifice means being in axially spaced relation to said bladder along said inner wall.

9. The improvement of claim 8, wherein said bladder is located in said annular cavity at an axial location near said rod end of said housing means and said orifice means are located between said bladder and the opposite end of said housing means.

10. The improvement of claim 8, wherein said spacing means comprises means in said annular cavity for maintaining the axial location of said bladder.

11. The improvement of claim 1, wherein said bladder is in the form of a sleeve extending axially along the portion of said inner wall of said annular cavity containing said orifice means.

12. The improvement of claim 11, wherein said spacing means comprises a baffle extending axially along said inner wall between said wall and said baffle and in straddling relation to said orifice means.

13. The improvement of claim 12, wherein said baffle comprises a pair of spaced apart side wall portions extending outwardly from said inner wall and an intermediate wall portion joining said side wall portions and contacting said bladder.

14. The improvement of claim 13, further including a series of fluid passageways extending along at least one of said side wall portions to facilitate fluid flow from said orifice means into said annular cavity.

15. A shock absorber as defined in claim 11 wherein said and said bladder includes means for adjusting the internal pressure of said bladder.

16. The improvement of claim 1, wherein the pressure within said bladder in the compressed condition as compared to the initial condition is in a ratio of about 2:1.

17. The improvement of claim 1 wherein said bladder includes means for permitting adjustment of the internal pressure of said bladder.

18. The improvement according to claim 1 wherein said bladder contains gas.

19. The improvement of claim 1, wherein said piston head and rod are in a fully extended condition when shock forces act initially upon said shock absorber.

20. The improvement of claims 1 or 19, wherein said bladder contains pressure only in an amount needed to return said piston from said retracted condition to said extended condition.

21. The improvement of claim 1, wherein the energy of said forces acting upon said shock absorber is fully absorbed during a single stroke of said piston and rod from said extended condition to said retracted condition.

22. The improvement of claim 1, wherein said piston head
is positioned within said elongated cavity so as to separate said cavity into a first variable-volume chamber and a second variable-volume chamber, said piston rod being arranged relative to said piston head so as to move within said second variable-volume chamber, and wherein
said housing means includes means defining at least one passage permitting flow communication between said annular cavity and said second variable-volume chamber and said piston means includes valve means controlling fluid flow from said second variable volume chamber to said first variable volume chamber when said rod is moved from retracted to extend condition.

23. A shock absorber comprising:
housing means including means defining an elongated cavity for containing hydraulic fluid and having two opposite ends, an annular cavity surrounding said elongated cavity and a plurality of orifices extending between said elongated and annular cavities and arranged generally in a path extending along an inner wall of said annular cavity;
piston means including a head slidably received by said elongated cavity and an elongated rod having one end joined to the piston head and the other end extending through said cavity-defining means at one end of said cavity, said piston head adapted to slidably move relative to and along said elongated cavity between said one and the other ends of said elongated cavity and sequentially close and open said orifices as said rod is moved between an extended condition at which a part of said rod extends from said housing means and a retracted condition at which said rod part is retracted within said housing means;
means defining a compressible bladder containing fluid under pressure positioned within said annular cavity and of such shape and size so as to extend along at least a portion of said inner wall of said annular cavity and in a manner leaving exposed said orifices opening into said annular cavity and so that when shock forces acting upon said shock absorber move said rod from said extended condition to said retracted condition and thereby force hydraulic fluid from said elongated cavity into said annular cavity through the open ones of said orifices, said bladder is compressed from an expanded condition to a contracted condition to function as an accumulator and to store energy for returning said rod to said extended condition once forces acting upon said shock absorber are relieved; and
means for spacing said bladder from said orifices to allow fluid flow through said orifices into said annular cavity.

24. A shock absorber as defined in claim 23 wherein said path of orifices extends axially along one side of said wall of said annular cavity and said bladder is wrapped within said annular cavity so as to define two opposing side edges extending axially along annular cavity and spaced from one another generally along said one side of said wall so that said orifices open into said annular cavity between said opposing edges of said bladder.

25. A shock absorber as defined in claim 24, wherein said spacing means comprises retaining means associated with said annular cavity of said housing means for maintaining said bladder in a substantially stationary condition relative to said housing means.

26. A shock absorber as defined in claim 25 wherein said retaining means includes a pair of retainer rails secured in position in said annular cavity so as to extend axially therealong, each of said rails positioned adjacent a corresponding one of said opposing side edges of said bladder to limit circumferential movement of said bladder relative to and about said annular cavity wall.

27. A shock absorber as defined in claim 25 wherein said bladder defines two opposite ends each corresponding with a corresponding end of said annular cavity and said retaining means includes means defining abutment surfaces between which said opposite ends of said annular cavity are positioned to limit longitudinal movement of said bladder relative to said annular cavity.

28. The improvement of claim 23, wherein said bladder is annular in shape extending around the entire circumference of said inner wall of said annular cavity, said orifices being in axially spared relation to said bladder along said inner wall.

29. The improvement of claim 28, wherein said bladder is located in said annular cavity at an axial location near said rod end of said housing means and said orifices are located between said bladder and the opposite end of said housing means.

30. The improvement of claim 28, wherein said spacing means comprises means in said annular cavity for maintaining the axial location of said bladder.

31. The improvement of claim 23, wherein said bladder is in the form of a sleeve extending axially along the portion of said inner wall of said annular cavity containing said orifices.

32. The improvement of claim 31, wherein said spacing means comprises a baffle extending axially along said inner wall between said wall and said baffle and in straddling relation to said orifices.

33. The improvement of claim 32 wherein said baffle comprises a pair of spaced apart side wall portions extending outwardly from said inner wall and an intermediate wall portion joining said side wall portions and contacting said bladder.

34. The improvement of claim 33, further including a series of fluid passageways extending along at least one of said side wall portions to facilitate fluid flow from said orifices into said annular cavity.

35. The improvement of claim 23, wherein the pressure within said bladder in the compressed condition as compared to the initial condition is in a ratio of about 2:1.

36. A shock absorber as defined in claim 23 wherein said bladder contains gas.

37. The improvement of claim 23, wherein said piston head and rod are in a fully extended condition when shock forces act initially upon said shock absorber.

38. The improvement of claims 23 or 37, wherein said bladder contains pressure only in an amount needed to return said piston from said retracted condition to said extended condition.

39. The improvement of claim 23, wherein the energy of said forces acting upon said shock absorber is fully absorbed during a single stroke of said piston and rod from said extended condition to said retracted condition.

40. The improvement of claim 23, wherein said piston head
- is positioned within said elongated cavity so as to separate said cavity into a first variable-volume chamber and a second variable-volume chamber, said piston rod being arranged relative to said piston head so as to move within said second variable-volume chamber, and wherein
- said housing means includes means defining at least one passage permitting flow communication between said annular cavity and said second variable-volume chamber and said piston means includes valve means controlling fluid flow from said second variable volume chamber to said first variable volume chamber when said rod is moved from retracted to extended condition.

41. A shock absorber comprising:
- housing means including means defining an elongated cavity for containing hydraulic fluid and having two opposite ends, an annular cavity surrounding said elongated cavity and orifice means between said elongated and annular cavities and extending along a path on an inner wall of said annular cavity;
- piston means including a head slidably received by said elongated cavity and an elongated rod having one end joined to the piston head and the other end extending through said cavity-defining means at one end of said cavity, said piston head adapted to slidably move relative to and along said elongated cavity between said one and the other ends of said elongated cavity and progressively close and open said orifice means as said rod is moved between an extended condition at which a part of said rod extends from said housing means and a retracted condition at which said rod part is retracted within said housing means;
- means defining a compressible bladder containing fluid under pressure positioned within said annular cavity and of such shape and size so as to extend along at least a portion of said inner wall of said annular cavity and in a manner leaving exposed said orifice means opening into said annular cavity and so that when shock forces acting upon said shock absorber move said rod from said extended condition to said retracted condition and thereby force hydraulic fluid from said elongated cavity into said annular cavity through said orifice means, said bladder is compressed from an expanded condition to a contracted condition to function as an accumulator and to store energy for returning said rod to said extended condition once forces acting upon said shock absorber are relieved;
- means for spacing said bladder from said orifice means to allow fluid flow through said orifice means into said annular cavity; and
- said piston head and rod being in a fully extended condition when shock forces act initially upon said shock absorber, said bladder containing pressure only in an amount needed to return said piston from said retracted condition to said extended condition, and the energy of said forces acting upon said shock absorber being fully absorbed during a single stroke of said piston and rod from said extended condition to said retracted condition.

42. A shock absorber as defined in claim 41, wherein said orifice means comprises a plurality of spaced orifices arranged generally in a series along said path.

* * * * *